United States Patent
Cox-Muranami et al.

(10) Patent No.: US 12,521,713 B2
(45) Date of Patent: Jan. 13, 2026

(54) METHOD AND APPARATUS TO IDENTIFY FLUIDIC PATH POSITIONS

(71) Applicant: ILLUMINA, INC., San Diego, CA (US)

(72) Inventors: Wesley A. Cox-Muranami, San Diego, CA (US); Sz-Chin Steven Lin, Ladera Ranch, CA (US); Rajagopal Panchapakesan, Escondido, CA (US); Darren Segale, San Diego, CA (US); Richard Lemoine, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 601 days.

(21) Appl. No.: 16/500,776

(22) PCT Filed: Apr. 2, 2018

(86) PCT No.: PCT/US2018/025665
§ 371 (c)(1),
(2) Date: Oct. 3, 2019

(87) PCT Pub. No.: WO2018/187201
PCT Pub. Date: Oct. 11, 2018

(65) Prior Publication Data
US 2020/0108386 A1    Apr. 9, 2020

Related U.S. Application Data

(60) Provisional application No. 62/482,397, filed on Apr. 6, 2017.

(51) Int. Cl.
*B01L 3/00* (2006.01)
*F16K 99/00* (2006.01)
(Continued)

(52) U.S. Cl.
CPC ... *B01L 3/502715* (2013.01); *B01L 3/502738* (2013.01); *B01L 3/502769* (2013.01);
(Continued)

(58) Field of Classification Search
CPC ......... B01L 3/502715; B01L 3/502738; B01L 3/502769; B01L 2300/06;
(Continued)

(56) References Cited

U.S. PATENT DOCUMENTS 9,440,233 B2    9/2016  Dothie et al.
2003/0012712 A1  1/2003  Norris
(Continued)

FOREIGN PATENT DOCUMENTS

CN    102036750    4/2011
CN    102671725    9/2012
(Continued)

OTHER PUBLICATIONS

Harbin Institute of Technology, English Machine Translation of CN 104696706 B, Jun. 2015, obtained on Aug. 31, 2023 from Google Patents. (Year: 2015).*

*Primary Examiner* — Christine T Mui
(74) *Attorney, Agent, or Firm* — Illumina, Inc.

(57) ABSTRACT

A method for testing a microfluidic device includes interfacing a microfluidic device to a fluidic parameter testing system. The microfluidic device has an internal rotary valve and internal fluidic channels. Each channel has a port with a predetermined port position that the rotary valve is to align to in order to select any one of a plurality of reagents which flow through the channels. The rotary valve is rotated via the testing system to a plurality of rotary valve position of the rotary valve. A fluidic parameter of the microfluidic device is measured at each rotary valve position. The fluidic parameter is mapped relative to the rotary valve positions. It is (Continued)

determined from the mapping if the rotary valve aligns with each of the predetermined port positions for a flow of the reagents through the channels.

17 Claims, 11 Drawing Sheets

(51) Int. Cl.
*G01F 1/80* (2006.01)
*G01M 3/26* (2006.01)
*G01M 13/003* (2019.01)
*G01M 13/00* (2019.01)

(52) U.S. Cl.
CPC ............ *F16K 99/0013* (2013.01); *G01F 1/80* (2013.01); *G01M 3/26* (2013.01); *G01M 13/003* (2019.01); *B01L 2300/047* (2013.01); *B01L 2300/06* (2013.01); *B01L 2300/0627* (2013.01); *B01L 2400/06* (2013.01); *B01L 2400/0644* (2013.01)

(58) Field of Classification Search
CPC ......... B01L 2300/0627; B01L 2400/06; B01L 2400/0644; B01L 2300/047; B01L 2200/146; B01L 2200/148; B01L 3/527; B01L 3/567; B01L 2200/025; B01L 2200/143; B01L 2300/027; B01L 2300/0663; B01L 2300/0864; B01L 2400/0487; G01M 13/003; G01M 3/26; G01M 3/2846; G01M 3/2876; F16K 99/0013; G01F 1/80; G01F 25/10
USPC .......................................................... 73/40
See application file for complete search history.

(56) References Cited

U.S. PATENT DOCUMENTS

| | | |
|---|---|---|
| 2003/0077495 A1 | 4/2003 | Scartozzi et al. |
| 2004/0179972 A1 | 9/2004 | Karp et al. |
| 2006/0177844 A1 | 8/2006 | Ching |
| 2009/0099782 A1 | 4/2009 | Kim et al. |
| 2010/0111768 A1 | 5/2010 | Banerjee et al. |
| 2011/0070654 A1 | 3/2011 | Tokhtuev et al. |
| 2011/0137596 A1 | 6/2011 | Grattoni et al. |
| 2013/0000388 A1 | 1/2013 | Allegato et al. |
| 2014/0069214 A1 | 3/2014 | Kruckow et al. |
| 2014/0276421 A1 | 9/2014 | Plahey et al. |
| 2015/0044696 A1* | 2/2015 | Dothie ................ F16K 99/0028 564/138 |
| 2016/0061349 A1 | 3/2016 | Shields et al. |
| 2016/0231155 A1 | 8/2016 | Sasaki et al. |
| 2016/0263578 A1 | 9/2016 | Schultz |

FOREIGN PATENT DOCUMENTS

| | | | |
|---|---|---|---|
| CN | 103105273 | 5/2013 | |
| CN | 104696706 | 6/2015 | |
| CN | 104696706 B * | 6/2015 | ................ F17B 3/18 |
| CN | 205333264 U | 6/2016 | |
| CN | 205826252 U | 12/2016 | |
| CN | 106536055 | 3/2017 | |
| DE | 102014221499 | 4/2016 | |
| WO | WO 03/044488 A1 * | 5/2003 | ............... G01N 1/38 |
| WO | 2005/085855 | 9/2005 | |
| WO | 2015/187868 | 12/2015 | |
| WO | 2016/004171 | 1/2016 | |
| WO | 2017/037072 | 3/2017 | |
| WO | WO 2018/187207 A2 * | 10/2018 | |

* cited by examiner

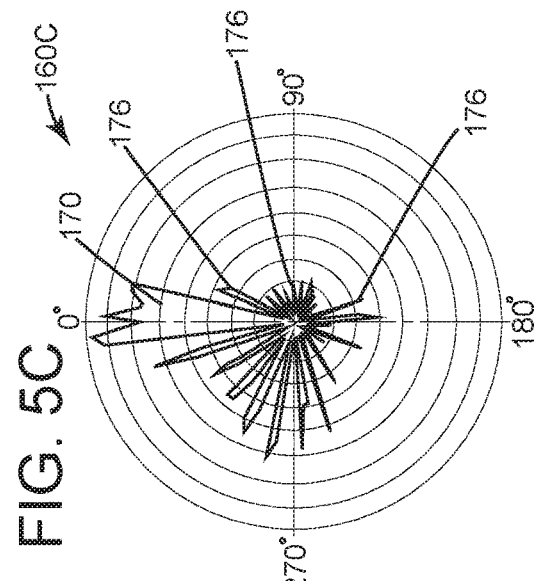
FIG. 5C
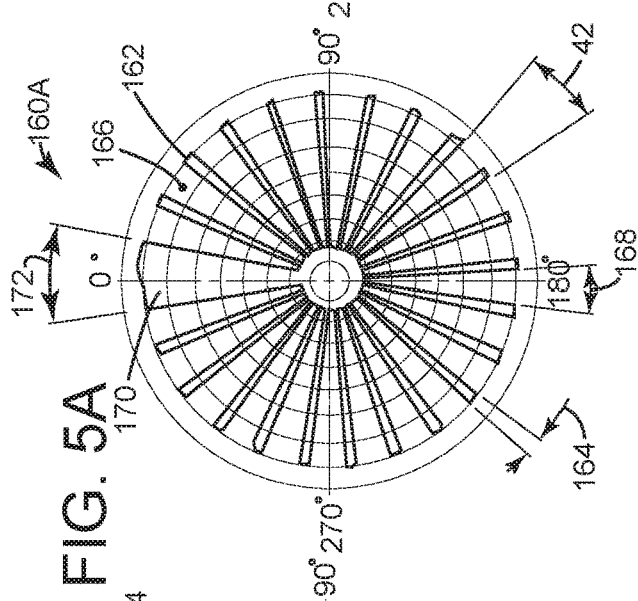
FIG. 5A
FIG. 5B
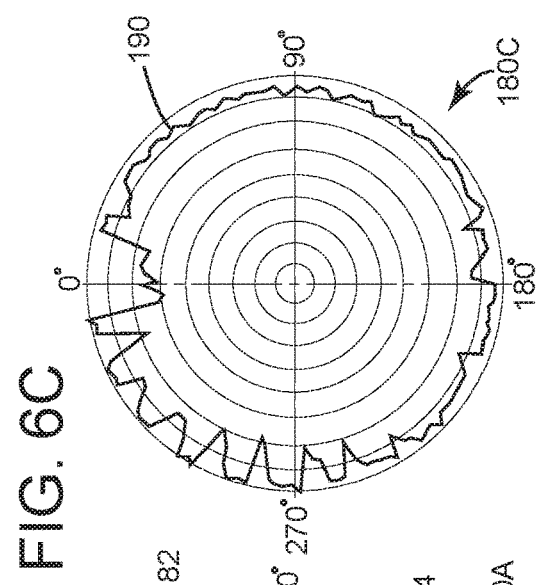
FIG. 6C
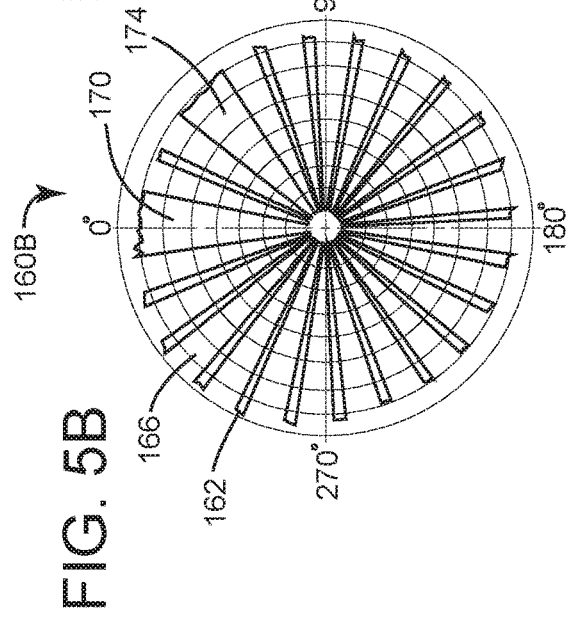
FIG. 6A
FIG. 6B

METHOD AND APPARATUS TO IDENTIFY FLUIDIC PATH POSITIONS

CROSS-REFERENCE TO RELATED APPLICATIONS

This application is a 35 U.S.C. § 371 National Stage application of International Patent Application No. PCT/US2018/025665, filed Apr. 2, 2018, which claims priority to U.S. Provisional Application No. 62/482,397, filed Apr. 6, 2017. The entire contents of each of the aforementioned applications are hereby incorporated herein by reference.

BACKGROUND

Microfluidics is a growing field in which low volume, often sub-millimeter scale, fluids are processed, controlled and/or measured to perform a variety of engineering and scientific tasks. Such tasks may include multiplexing for the telecommunications and computer industries, high-throughput sequencing for the health and pharmaceutical industries and more.

Many microfluidic devices, such as microfluidic devices for gene sequencing, may include an internal rotary selector valve and multiple internal fluidic channels. The rotary valve should align with each channel in order to select any one of a plurality of reagents which flow through the channels. To keep the cost of these microfluidic devices down, they are being produced in larger scale batch manufacturing processes.

In some instances, however, large scale batch manufacturing of such microfluidic devices may introduce device to device variations which should be accounted for. Such variations can be introduced through injection molding, manual assembly, normal component tolerances and the like. These variations may cause such problems as improper alignment of the rotary valve to the channels, variations in port sizes of the channels, undesired fluid leak paths, undesired fluid occlusions within the channels, unacceptably large hysteresis of the rotary valve and more.

Visual inspection of rotary valve to channel port alignment is a pre-existing method of quality inspection of such batch produced microfluidic devices. In some instances, however, this puts restrictions on the structure of microfluidic devices in that they have to be designed to be transparent or translucent for visual inspection, or they have to be designed with adequate internal clearances to allow for the insertion of optical instrumentation. Such optical instrumentation may include cameras, lasers or the like to enable a user to visually verify rotary valve to channel port alignment.

Moreover, the technology involved in some microfluidic devices makes such optical verification difficult if not impossible to conduct. Such microfluidic devices are often opaque and include structure that precludes optical access to the components that need to be inspected or tested.

Accordingly, there is a need for an apparatus and method of testing rotary valve to channel alignment in opaque microfluidic devices, which have no optical access, with minimal, or even without, the use of optical measurements or optical instrumentation. There is also a need to be able to test mass produced microfluidic devices for such other problems as: variations in port sizes of the channels, undesired fluid leak paths, undesired fluid occlusions within the channels, unacceptably large hysteresis of the rotary valve and more.

BRIEF DESCRIPTION

The present disclosure offers advantages and alternatives over the prior art by providing a method for, and apparatus of, a fluidic parameter testing system to test rotary valve to fluidic channel alignment in mass produced opaque microfluidic devices. Additionally, the testing system can test for such problems as variations in port sizes of the channels, undesired fluid leak paths, undesired fluid occlusions within the channels, unacceptably large hysteresis of the rotary valve and more.

Examples provided herein include microfluidic device testing systems and methods of making the same. More specifically, examples provided herein include methods and apparatus to identify fluidic path positions within a microfluidic device.

A method in accordance with one or more aspects of the present disclosure includes interfacing a microfluidic device to a fluidic parameter testing system. The microfluidic device has an internal rotary valve and internal fluidic channels. Each channel has a port with a predetermined port position that the rotary valve is to align to in order to select any one of a plurality of reagents which flow through the channels. The rotary valve is rotated via the testing system to a plurality of rotary valve positions of the rotary valve. A fluidic parameter of the microfluidic device is measured at each rotary valve position. The fluidic parameter is mapped relative to the rotary valve positions. It is determined from the mapping if the rotary valve aligns with each of the predetermined port positions for a flow of the reagents through the channels.

Another method in accordance with one or more aspects of the present disclosure includes interfacing a microfluidic device to one of an air pressure testing system and a mass flow testing system. The microfluidic device has an internal rotary valve and internal fluidic channels. Each channel has a port with a predetermined port position that the rotary valve is to align to in order to select any one of a plurality of reagents which flow through the channels. The rotary valve is rotated via the testing system to a plurality of rotary valve positions of the rotary valve. One of air pressure and mass flow of the microfluidic device is measured at each rotary valve position. The one of the air pressure and the mass flow is mapped relative to the rotary valve positions. It is determined from the mapping if the rotary valve aligns with each of the predetermined port positions for a flow of the reagents through the channels.

A fluidic parameter testing system in accordance with one or more aspects of the present disclosure includes a rotary valve controller system to rotate an internal rotary valve of a microfluidic device to be tested to a plurality of rotary valve positions of the rotary valve. The fluidic parameter testing system also includes a fluidic parameter disclosure and sensing system to:
  induce a fluidic parameter into the microfluidic device at each rotary valve position,
  measure the fluidic parameter at each rotary valve position without the use of optical instruments, and
  map the fluidic parameter relative to the rotary valve positions.

DRAWINGS

The disclosure will be more fully understood from the following detailed description taken in conjunction with the accompanying drawings, in which:

FIG. 5A is a graph of pressure vs rotary valve angular position of a fluidic device that has no unwanted anomalies in accordance with one example described herein;

FIG. 5B is a graph of pressure vs rotary valve angular position of a fluidic device that has a single blocked channel port in accordance with one example described herein;

FIG. 5C is a graph of pressure vs rotary valve angular position of a fluidic device wherein the rotary valve is not well sealed to the enclosure of the fluidic device in accordance with one example described herein;

FIG. 6A is a graph of rate of change of pressure vs. rotary valve angular position of the fluidic device of FIG. 5A in accordance with one example described herein;

FIG. 6B is a graph of rate of change of pressure vs. rotary valve angular position of the fluidic device of FIG. 5B in accordance with one example described herein;

FIG. 6C is a graph of rate of change of pressure vs. rotary valve angular position of the fluidic device of FIG. 5C in accordance with one example described herein;

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example may be combined with the features of other examples. Such modifications and variations are intended to be included within the scope of the present disclosure.

The terms "substantially", "approximately", "about", "relatively," or other such similar terms that may be used throughout this disclosure, including the claims, are used to describe and account for small fluctuations, such as due to variations in processing. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 1A:
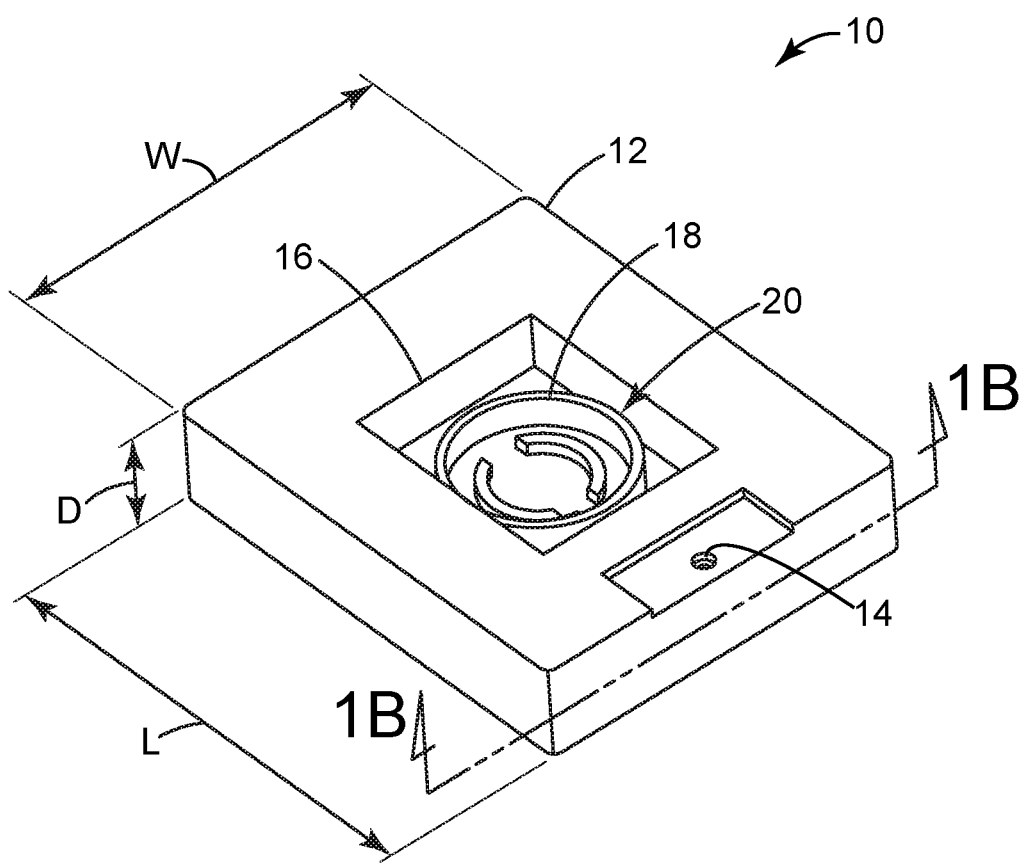
FIG. 1A is a simplified perspective view of an opaque microfluidic device having a rotary valve and a plurality of microfluidic channels with channel ports in accordance with one example described herein.
Figure 1B:
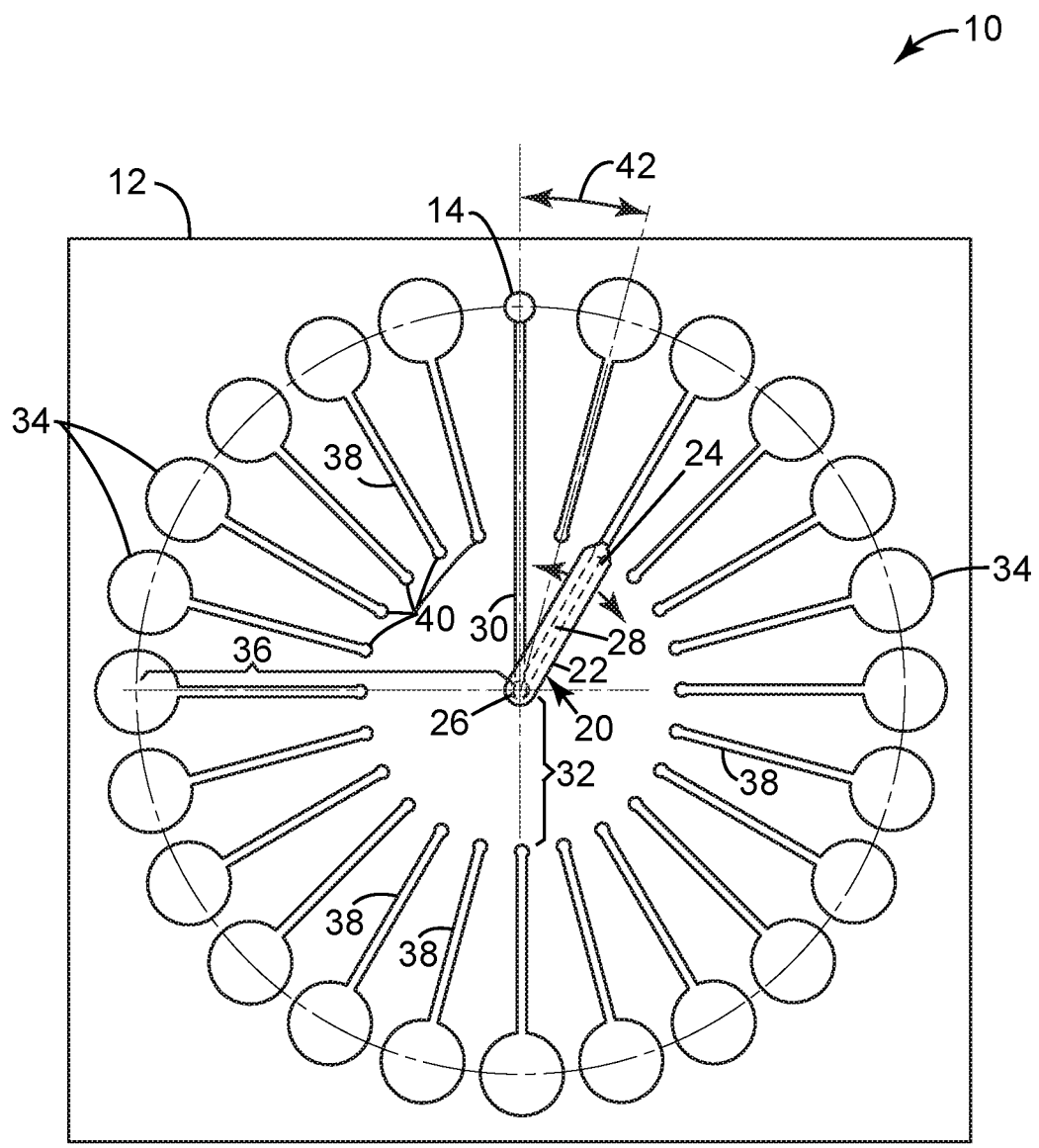
FIG. 1B is an internal cross sectional view of the example device of FIG. 1A taken along the line 1B-1B.

FIGS. 1A and 1B illustrate an example of an opaque microfluidic device 10 having a plurality of internal microfluidic channels 38 and an internal rotary selector valve 20. FIGS. 2-9 illustrate various examples of a method and apparatus for testing the microfluidic device 10 with a fluidic parameter testing system 100 in accordance one or more examples described herein.

Referring to FIG. 1A, an example of a perspective view of a microfluidic device 10 is illustrated. The microfluidic device 10 may be manufactured in large scale batch manufacturing processes. Additionally, the device 10 is considered to be opaque in that it is not manufactured with transparent or translucent materials to allow for visual inspection, and it is not designed with the internal component clearances to allow optical instrumentation to be inserted into device 10 for optical observation and/or visual inspection purposes.

The microfluidic device (or cartridge) 10 has a boxlike outer enclosure 12. The enclosure 12 has a length L of approximately 6 inches, a width W of approximately 4 inches and a depth D of approximately 2 inches. The enclosure 12 includes an inlet-outlet port 14 located at a top end of the enclosure 12 and a recessed section 16 disposed centrally within the enclosure 12. The recessed section 16 is sized to allow a rotatable outer keyed portion 18 of a rotary valve 20 to protrude through. The keyed portion 18 may be mechanically coupled to a motor shaft and rotated through 360 degrees in either the clockwise or counterclockwise directions.

Referring to FIG. 1B, a cross-sectional internal view of the opaque microfluidic device 10 of FIG. 1A, taken along the cut line 1B-1B, is presented. The rotary valve 20 has an internal valve body 22 that is affixed to the rotatable outer keyed portion 18. The valve body 22 includes a centrally located rotary valve outlet 26, around which the valve body 22 pivots when the keyed portion 18 is rotated. The inlet-outlet port 14 and the valve outlet 26 are connected in open fluid communication through an inlet-outlet passage 30.

The valve body 22 also includes a moveable valve inlet port 24 disposed on a distal end of the valve body 22 at a first radial distance 32 from the outlet valve 26. The valve inlet port 24 and valve outlet 26 are connected in open fluid communication with each other through a central valve passage 28. As the valve body 22 pivots around the valve outlet 26, it swings the valve inlet port 24 through 360 degrees of rotation in either the clockwise or counterclockwise directions.

Microfluidic device 10 also includes a plurality of refillable fluid wells 34 that are disposed internally around the periphery of the device 10 at a second radial distance 36 from the outlet valve 26. The second radial distance 36 being larger than the first radial distance 32. The fluid wells 34 are designed to contain a variety of fluid reagents that may be utilized for various scientific or engineering tasks, such as DNA sequencing. In this example, the fluid wells 34 may each contain from about 0.1 milliliters (ml) to about 5 ml of fluid reagent.

In this particular example, there are a total of twenty-three (23) wells 34. The wells 34, together with the inlet-outlet port 14, are each spaced apart around the periphery of device 10 at equal spacing angles 42 of fifteen (15) degrees each.

An internal fluidic channel 38 extends radially inward from each fluidic well 34 toward the centrally located valve outlet 26. Each channel 38 includes a channel port 40, which terminates the distal ends of the channels 38 at predetermined port positions that are located at the fixed radial distance 32 from the valve outlet 26. There are twenty-three channel ports 40 corresponding to the twenty-three wells 34 and twenty-three channels 38 disposed within the device 10.

In this particular example, the port positions of channel ports 40 are also each spaced equally apart by the spacing angle 42 of fifteen degrees. Accordingly the ports 40 form a circle around the valve outlet 26 having a radius equal to the radial distance 32.

During operation, the rotatable keyed portion 18 of rotary valve 20 is rotated by a motor, or other like mechanical device, to align the valve inlet port 24 with any one of the predetermined port positions of the channel ports 40 in order to select any one of the plurality of reagents located in the wells 34. The term "align" or "alignment" in the present disclosure encompasses perfect alignment and alignment with relatively small, insignificant amount of deviation/misalignment (e.g., ≤5%). Once aligned, the selected reagent (not shown) will flow (e.g., via pressure differential or similar) from the selected well 34 through the channel 38, through the inlet port 24 and outlet 26 of the rotary valve 20, through the inlet-outlet channel 30 and out the inlet-outlet port 14.

However, in some examples due to variations involved in large scale batch manufacturing processes, such as injection molding, manual assembly and the like, there will be variations in the position of the ports 40 from device to device. Therefore, it is desirable to confirm alignment of the rotary valve 20 with each port 40 for each opaque microfluidic device 10 during a quality control testing phase of the manufacturing process. Moreover, it is highly desirable to test, and account, for other types of device to device variations such as the degree of hysteresis from clockwise to counterclockwise rotation of the rotary valve 20, variations in channel port 40 sizes, blocked channels 38, unwanted occlusions, unwanted leakage paths and the like.

Figure 2:
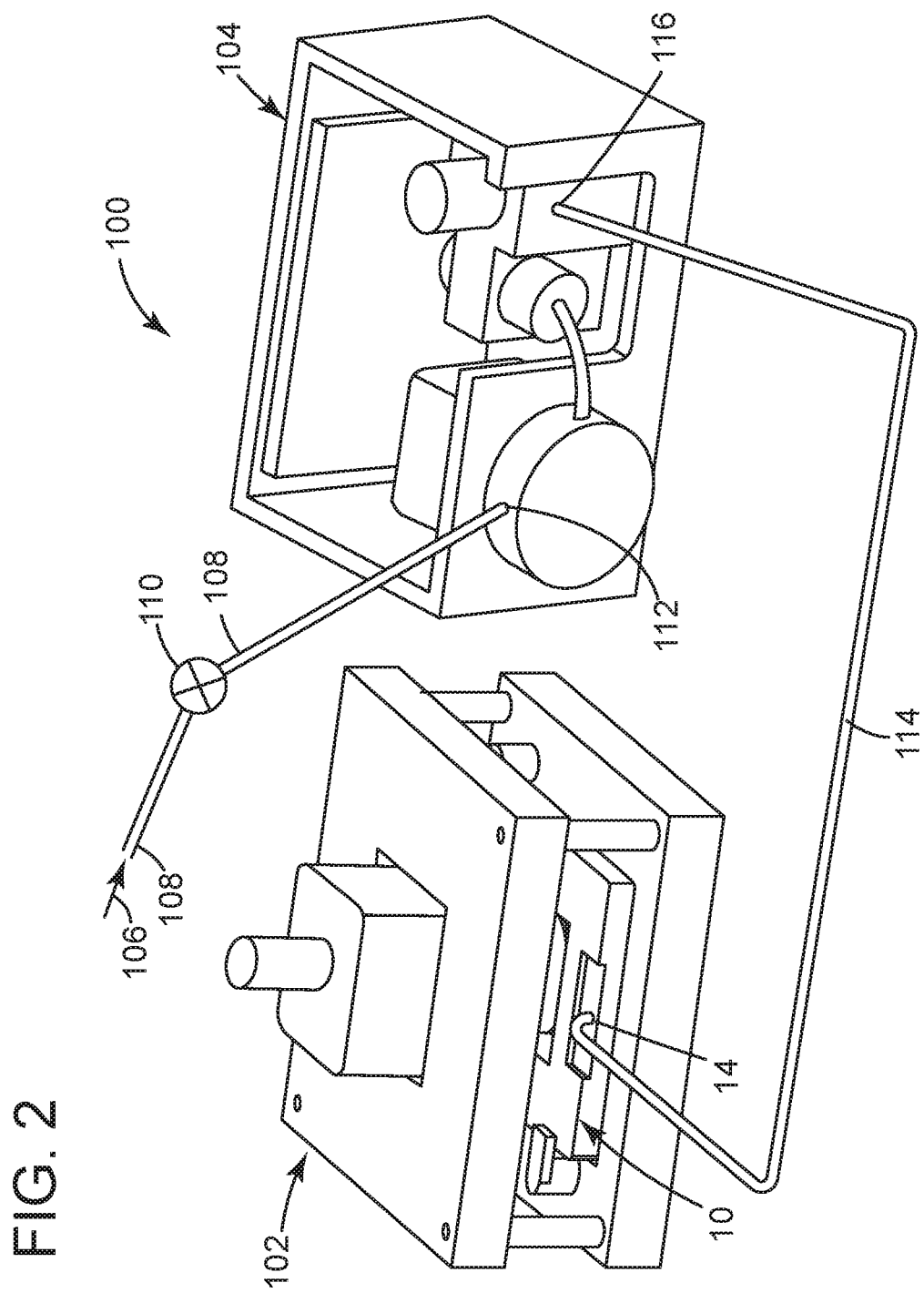
FIG. 2 is a simplified perspective view of a microfluidic testing system for testing the microfluidic device of FIGS. 1A and 1B in accordance with one example described herein.

Referring to FIG. 2, a simplified perspective view of an example of a fluidic parameter testing system 100 for performing such previously mentioned tests on opaque microfluidic devices 10 in accordance with one example described herein is illustrated. The testing system 100 includes a rotary valve controller system 102 and a fluidic parameter disclosure and sensing system 104.

In this particular example, the controller system 102 and the sensing system 104 are packaged as two separate modules. That is, the controller system 102 is packaged as a controller module 102 and the sensing system 104 is packaged as a sensing module 104. It is noted the controller system 102 and sensing system 104 may be packaged in several other suitable ways. For example, the systems 102, 104 may be packaged as a stand-along single module, may be incorporated into a larger system or may be packaged into more than two modules.

The rotary valve controller system 102 enables direct control of a rotary valve 20 of a fluidic device 10, which is mounted within the controller system 102. The controller system is operable to rotate the rotary valve 20 in discrete angular increments 203 (best seen in FIG. 8), wherein each increment corresponds to a predetermined rotary valve position of the rotary valve 20. Alternatively, the controller system 102 can operate to rotate the rotary valve continuously through each rotary valve position.

The fluidic parameter disclosure and sensing system 104 is designed to induce a fluidic parameter into the microfluidic device 10 at each rotary valve position. The fluidic parameter is then measured at each rotary valve position with minimal, or in some instances even without, the use of optical instruments, such as cameras, lasers, visual observation by a user or the like. The sensing system 104 then maps the fluidic parameter relative to the rotary valve positions. From the mapping, it can be determined if the rotary valve 20 aligns with each of the port positions of the ports 40 for a flow of the reagents through the channels 38.

For purposes of clarity herein, it is important to note that a fluidic parameter used to test a microfluidic device 10 will not change as the rotary valve position changes. Rather the magnitude of that fluidic parameter may change as the rotary valve rotates past leakage paths and occlusions within the microfluidic device 10, but the fluidic parameter itself will not change. Therefore, inducing, measuring and/or mapping of a fluidic parameter at a plurality of rotary valve positions means inducing, measuring and/or mapping a magnitude of that fluidic parameter at the plurality of rotary valve positions.

For example, a single fluidic parameter of air pressure may be induced over five rotary valve positions, wherein that single fluid parameter is measured to have magnitudes of 1 psi, 10 psi, 3 psi, 9 psi and 2 psi sequentially as the rotary valve is rotated through each position. Once measured, the single fluidic parameter may be mapped in the form of a graph of air pressure vs. angular position, wherein the five measured magnitudes of that single fluidic parameter are plotted for each corresponding angle.

It is also important to note that the increments 203 that correspond to the rotary valve positions of the rotary valve 20 may be sized and defined by the user of the testing system 100. In this particular example, the increments are sized at 0.56 degrees each. As the rotary valve rotates through its full 360 degree range, it indexes through about 643 increments, which correspond to 643 different rotary valve positions.

It is also important to note that if the rotary valve were continuously rotated, rather than being rotated in discrete increments 203, the measured rotary valve positions may still be sized and defined by the user of the testing system 100. The angular distance between any adjacent measured rotary valve positions is only limited by the sampling rate of the data acquisition system used by system 100 to collect the measurements. As such, when the rotary valve is continuously rotated, the angular distance between adjacent measured rotary valve positions can be sized at least as small as the discrete angular increments 203 and potentially much smaller.

The rotary valve 20 does not simply index from one channel port 40 to the next channel port 40 of which there may be 20 to 40. That is because in some examples the user wants to characterize the entire interface plane of the rotary valve, not just where the ports 40 are located. For that reason, the angular width of the increments 203 and/or the angular distance between measured rotary valve positions may be small (for example, less than or equal to about 10 percent) compared to the angular width 205A, 205B of the ports 40 (best seen in FIG. 8). By having the increments 203 and/or measured rotary valve positions small relative to the angular widths 205 of the channel ports 40, the resolution of the testing system 100 is such that the user can determine if the ports 40 are larger or smaller than expected, if the gaps between the ports 40 are acting as leak paths and other characteristics and/or anomalies of the device 10.

The testing system 100 may be designed to operate with any number of fluid parameters or combinations of fluid parameters. For example, the fluidic parameter testing system 100 may operate with such fluid parameters as pressure difference, rate of change of pressure, mass flow, rate of change of mass flow or similar. Additionally, the fluid parameters may be induced into the microfluidic device through such fluids as air, nitrogen, oil, water or the like.

However, in the following examples, the fluidic parameter testing system 100 will be described as an air pressure testing system 100 or a mass flow testing system 100 wherein the specific fluidic parameter utilized to do the testing is air pressure or mass flow respectively. As such, the fluidic parameter application and sensing system 104 may be referred to herein as an air pressure application and sensing system 104 when the fluidic parameter is air pressure (for example air pressure in pounds per square inch gage (psi)) or a mass flow application and sensing system 104 when the fluidic parameter is mass flow (for example mass flow of air in standard cubic centimeters (sccm)).

As will be explained in greater detail herein, a source of pressurized air 106 (such as shop air, an air pump, a large air tank or similar) is fed through tubing 108 to a regulator 110, which provides a source of relatively constant air pressure (for example, constant to plus or minus about 10 percent or less) to an inlet 112 of the sensing system 104. The sensing system 104 then enables specific mass flows and pressures of air to be metered to the device 10 being tested via tubing 114, which connects from an outlet 116 of the sensing system 104 to the inlet-outlet port 14 of the device 10.

Figure 3:
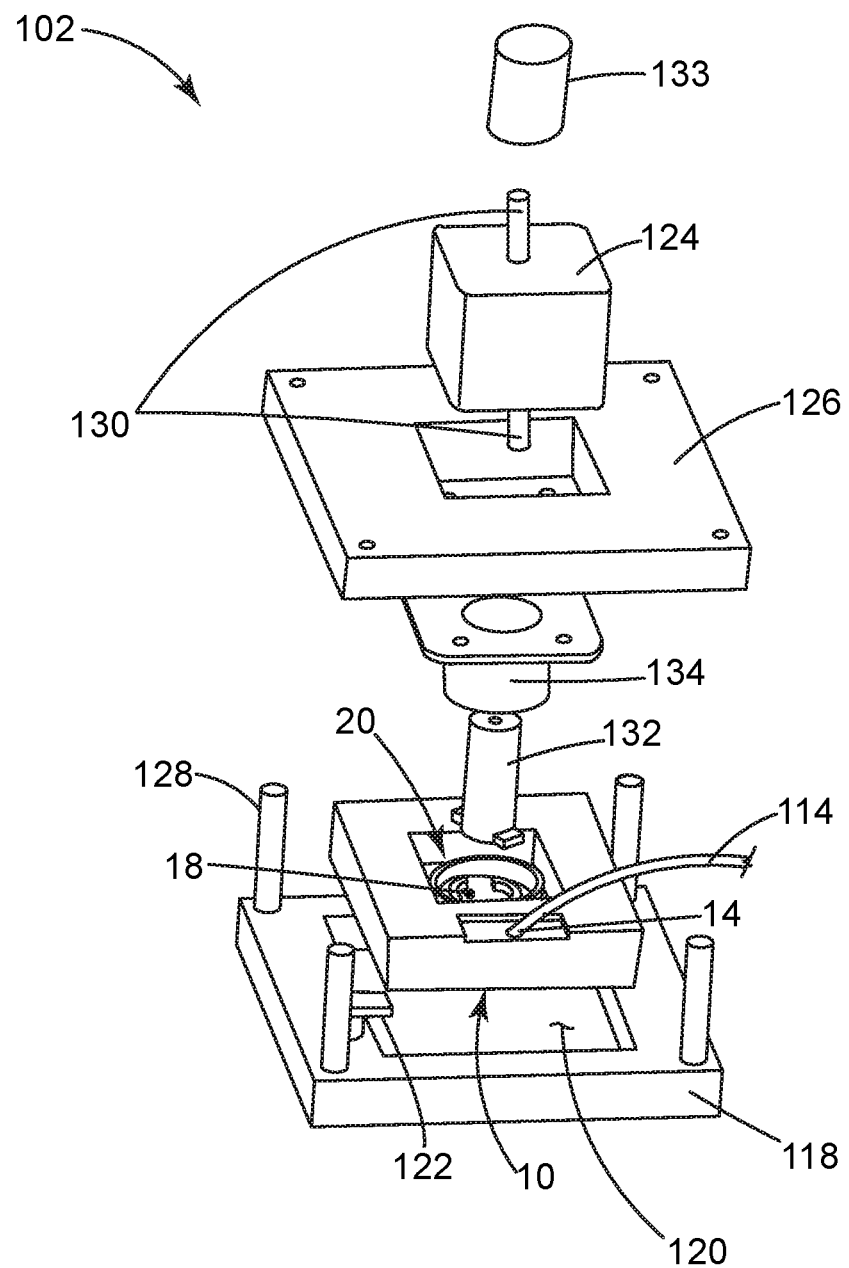
FIG. 3 is an exploded perspective view of a rotary valve controller system included in the example microfluidic testing system of FIG. 2 in accordance with one example described herein.

Referring to FIG. 3, an exploded perspective view of an example of the rotary valve controller system 102 is presented. The controller system 102 includes a rectangular base plate 118. The base plate 118 includes a centrally located recessed section 120 that is sized to allow a microfluidic device 10 to be mounted therein. One or more clasps 122 are used to secure the device 10 within the recessed section 120 during testing.

The controller system 102 also includes a motor 124, such as a stepper motor, servo motor or similar, which is mounted to a top plate 126. The top plate 126 is spaced apart from the base plate 118 by a set of spacers 128. The motor 124 includes a motor shaft 130 that extends through both rear and front ends of the motor 124.

Out of the front end of the motor 124, the shaft 130 extends through the top plate 126 and engages a rotary valve interface bracket 132. The rotary valve interface bracket 132 also engages with the keyed portion 18 of the rotary valve 20 that protrudes through the device 10 being tested.

The interface bracket 132 mechanically couples the rotary valve 20 to the motor shaft 130. Additionally, the interface bracket 132 can easily be modified to secure a variety of different microfluidic devices 10 having a variety of rotary valves 20 to the motor shaft 130.

Out of the rear end of the motor 124, the shaft engages with an encoder 133. The encoder provides position information of the motor shaft to an end user and to a control board 156 (best seen in FIGS. 4A and 4B).

A pressing cylinder 134 is disposed between the top plate 126 and the interface bracket 132. The pressing cylinder 134 ensures application of a predetermined amount of force to compress and seal the interface bracket 132 to the rotary valve 20 that is being tested.

Figure 4A:
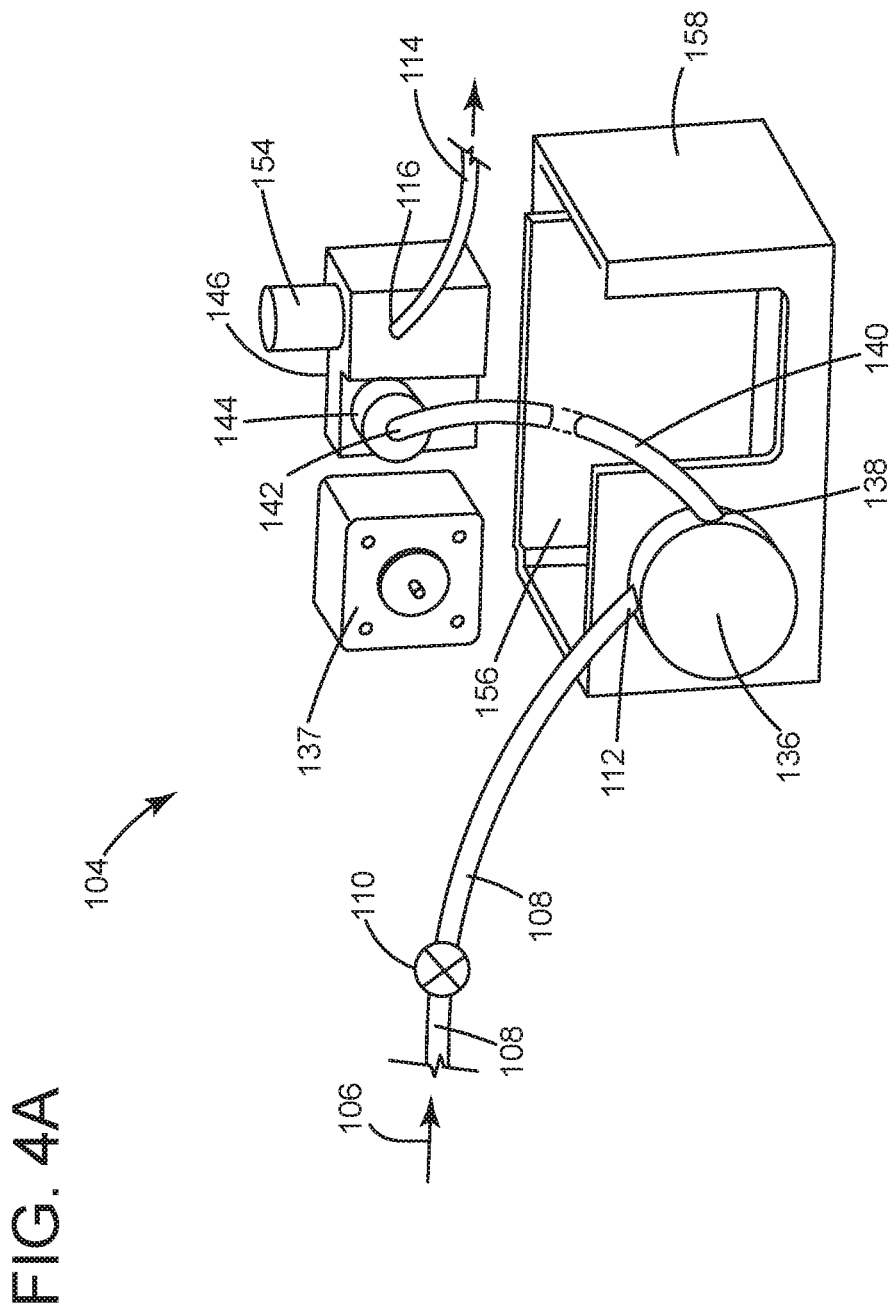
FIG. 4A is an exploded perspective front view of a fluidic parameter application and sensing system included in the microfluidic testing system of FIG. 2 in accordance with one example described herein.
Figure 4B:
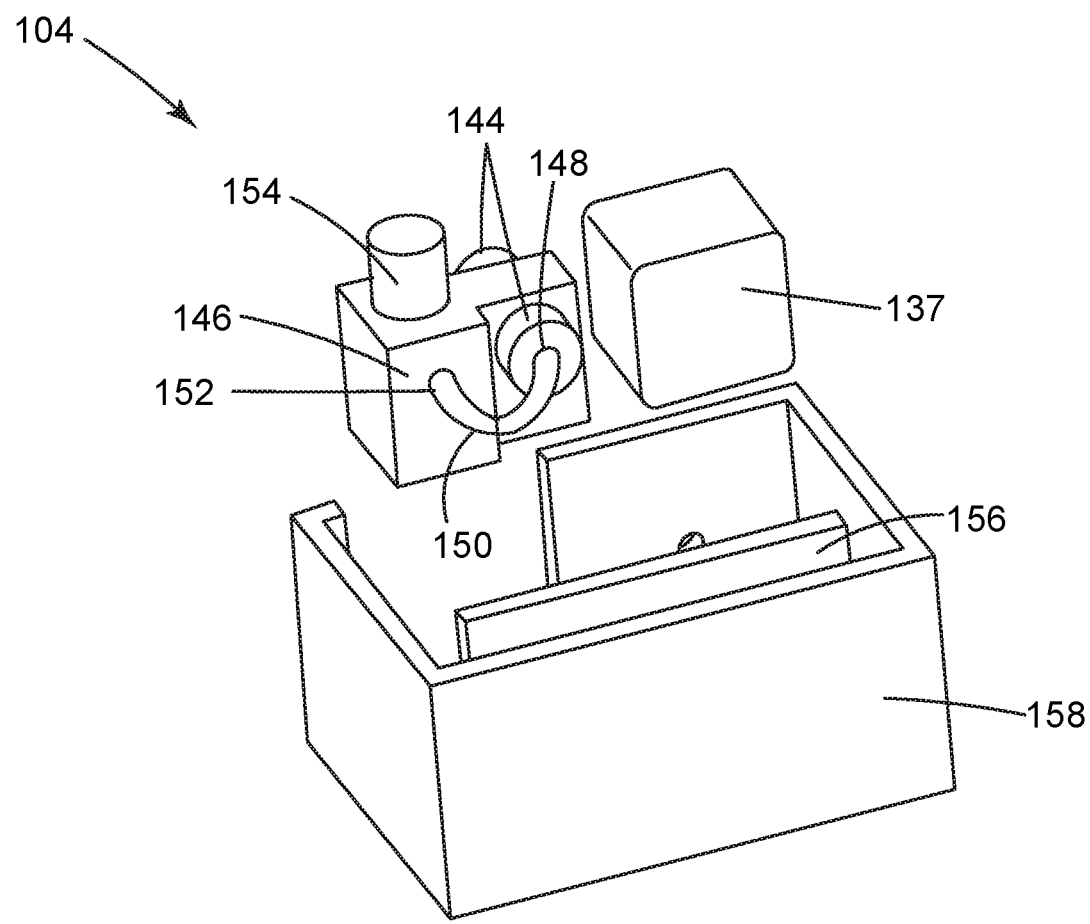
FIG. 4B is an exploded perspective rear view of the fluidic parameter application and sensing system of FIG. 4A in accordance with one example described herein.

Referring to FIGS. 4A and 4B, an exploded perspective front (FIG. 4A) and rear (FIG. 4B) view of an example of the fluidic parameter application and sensing system 104 is presented. As mentioned earlier with reference to FIG. 2, in this example, the sensing system 104 is an air pressure application and sensing system 104 when the fluidic parameter utilized to do the testing is air pressure and a mass flow application and sensing system when the fluidic parameter utilized to do the testing is mass flow of air.

Referring to FIG. 4A, shop air 106 (or other suitable pressurized air source) is fed into the regulator 110 where the air pressure is regulated down and kept relatively constant (for example, constant to plus or minus about 10 percent or less). The air pressure can be adjusted to meet application testing requirements. A pressure range for this example may be between 10 and 20 psi, which may be held relatively constant within plus or minus about 10 percent of its regulated value or less. The air pressure is fed to the inlet 112 of the sensing system 104 through tubing, such as Teflon™ tubing or similar. (Teflon™ is a registered trademark of the Chemours Company of Wilmington, Delaware, USA.)

The inlet 112 of the sensing system 104 is the inlet of a two position air switch valve 136, which is mounted to the sensing system housing 158. The air switch valve 136 is operated by a motor 137, which is also mounted in housing 158. The switch valve can switch the valve 136 between an opened and a closed position on the inlet 112 end. The air switch valve 136 also feeds toward a switch valve outlet end 138.

The switch valve outlet 138 is connected via tubing 140 (such as Teflon™ tubing or similar) to an air chamber inlet 142 of an adjustable small volume air chamber 144 that is built into a fluidic manifold 146. The fluidic manifold 146 being rigidly mounted into housing 158.

The adjustable air chamber 144 is designed to hold various specific small volumes of air to be metered to the device 10 under test, depending on applications. For example, the air chamber 144 may have an enclosed section (not shown) that can hold different lengths of tubing, and thus different volumes. Alternatively, the air chamber 144 may have a housing that can hold modules (not shown) of various volumes. A range of air volumes for this example may be between 25 to 100 microliters.

Referring to FIG. 4B, the air chamber 144 also includes an air chamber outlet 148 that protrudes out the rear of the manifold 146. The air chamber outlet 148 is connected via tubing 150 (also Teflon™ tubing or similar) to a sensor inlet port 152, which is also disposed on the rear of the manifold 146.

The sensor inlet port 152 conducts the air flow and pressure to a pressure sensor or a mass flow sensor 154, which is also mounted to the manifold 146. If the sensor 154 were a pressure sensor, it may be any one of various well known types of pressure sensors or pressure transducers that are capable of measuring pressures or pressure changes per the testing requirements of the device 10. If the sensor 154 were a mass flow sensor, it may also be any one of various well known types of mass flow sensors or mass flow transducers that are capable of measuring mass flow of air or rate of change of mass flow of air per the testing requirements of the device 10. In one example of the air pressure testing system 100, the pressure sensor may be a pressure sensor with the part number PX2AM1XX100PSCHX from the Honeywell Corporation.

Referring back to FIG. 4A, the inlet port 152, and the sensor 154, are connected in parallel to the outlet 116 of the manifold, which is also the outlet of the sensing system 104. The outlet 116 is disposed in the front of the manifold 146 and is connected via tubing 114 (also Teflon™ tubing or similar) to the inlet-outlet passage 14 of device 10 that is mounted in the controller system 102.

A control board 156 is also mounted in housing 158. The control board 156 is used to control the functions of both the controller system 102 and the sensing system 104 and includes systems and/or controls that are considered herein as part of both systems 102 and 104.

For example, the control board 156 includes a motor control system (not shown) for the stepper (or servo) motor 124, which is considered a part of the controller system 102. The motor control system for the motor 124 receives motor shaft 130 position information from the encoder 133. Based on the encoder's 133 position information, the motor control system can operatively send position control commands as specified by a user to rotate the motor shaft 130 such that the motor shaft rotates the rotary valve 120. In the example of the air pressure testing system 100, the rotary valve 20 may be rotated in discrete angular increments 203 (best seen in FIG. 8) to any one of the rotary valve positions. Alternatively, in the example of the mass flow testing system 100, the rotary valve 20 may be continuously the rotated, rather than in discrete increments, to the various rotary valve positions to be measured.

Also by example, the control board 156 includes a motor control system (not shown) for the motor 137, which is considered a part of the sensing system 104. The motor control system for the motor 137 can send commands to the motor 137 to switch the air switch valve 136 from the opened position to the closed position. Also, the control board 156 can sense and process signals from the sensor 154, which is also considered part of sensing system 104.

During operation, the stepper or servo motor 124 of the controller system 102 receives commands from the control board 156 as specified by a user. The stepper motor 124 rotates to the commanded position at a specified rotational acceleration and velocity, while the encoder 133 provides real-time position information back to the control board 156.

In some examples, the motor 124 will rotate the valve inlet port 24 of the rotary valve 20 in discrete angular increments, or continuously, through 360 degrees of rotation in either the clockwise or counterclockwise directions. In the example of an air pressure testing system 100, the positional angular increments are sized at 0.56 degrees, but any number of other angular increment sizes may be used depending on applications. For example, the angular increments may be sizes at 0.056 increments or less. Each angular increment corresponds to a predetermined rotary valve position of the inlet port 24 of the rotary valve 20. In the example of a mass flow testing system 100, angular distances between adjacent rotary valve positions that are to be measured can potentially be even smaller than the discrete increments 203.

In the example of the air pressure testing system 100, at each rotary valve position, the control board 156 commands the motor 137 to switch the air switch valve 136 to the opened position. In its opened position, air switch valve 136 opens fluid communication from the pressure regulated air source 106 to the adjustable air chamber 144 to pressurize the chamber 144 to a predetermined air pressure, such as 11 pounds per square inch gage (i.e., 11 psi).

Once the predetermined air pressure has been reached, the air switch valve 136 is commanded by the control board 156 to switch to its closed position. In its closed position, the air switch valve 136 closes fluid communication from the air source 106 to the chamber 144. The pressure sensor 154 then measures the pressure in the air chamber 144 to determine if there is a release of air pressure (which may indicate a leakage path) or if the pressure holds (which may indicate a seal or an occlusion). The measured air pressure data from the pressure sensor 154 are then stored and processed by the system 100 in order to map the air pressure measurements (or other fluidic parameter measurements if another fluidic parameter other than air pressure where to be used) relative to the rotary valve position.

Once the data are measured for a particular rotary valve position, the controller system 102 rotates the rotary valve 20 another angular increment to the adjacent rotary valve position to start the cycle over again. This process may continue to provide a mapping of the air pressure measurements vs. rotary valve position through 360 degrees of rotation. From the mapping, the system 100 can process the data to determine if the valve inlet port 24 of the rotary valve 20 aligns with each of the known channel port positions 40 in order to allow for flow of reagents through the channels 38 of the microfluidic device 10.

In the example of the mass flow testing system 100, the control board 156 commands the motor 137 to hold the air switch valve 136 in its opened position as the rotary valve 20 is continuously rotated through each rotary valve position and desirably through 360 degrees of the rotary valves range. In its opened position, air switch valve 136 opens fluid communication from the pressure regulated air source 106 to the mass flow sensor 154 to pressurize the sensor 154 to a predetermined air pressure, such as 8 pounds per square inch gage (i.e., 8 psi).

The pressure sensor 154 then measures the mass flow of air in the air chamber 144 to determine if there is a mass flow that is equal to or greater than a first leak flow threshold (which may indicate a leakage path) or if the mass flow is equal to or less than a second no-leak flow threshold (which may indicate a seal or an occlusion). The measured mass flow data from the mass flow sensor 154 is then stored and processed by the system 100 in order to map the mass flow measurements relative to the rotary valve position.

While the data are measured for a particular rotary valve position, the controller system 102 continuously rotates the rotary valve 20 to the adjacent rotary valve position, which is defined by applications. This process continues to provide a mapping of the air mass flow measurements vs. rotary valve position through 360 degrees of rotation. From the mapping, the system 100 can process the data to determine if the valve inlet port 24 of the rotary valve 20 aligns with each of the known channel port positions 40 in order to allow for flow of reagents through the channels 38 of the microfluidic device 10.

Mapping a fluidic parameter (such as air pressure, mass flow or similar) relative to the rotary valve positions can be performed in several ways. For example, the mapping can take the form of a graph of the mapped data for visual verification of sufficient alignment. Alternatively, the mapped data can be processed electronically, displayed as a printed table of organized data or similar in order to determine (electronically, manually or otherwise) alignment of the valve inlet port 24 to the channel ports 40. Additionally, the mapping can be used to determine other characteristics and/or anomalies, such as hysteresis, port size variations and more.

In addition to air pressure measurements or mass flow measurements, the testing system 100 may measure a plurality of fluidic parameters at each rotary valve position. For example, system 100 may measure a pressure, a pressure difference, a rate of change of pressure, a mass flow and a rate of change of mass flow. The plurality of fluidic parameters may then also be mapped relative to the rotary valve positions. From the mapping of the plurality of fluidic parameters, it can be determined if the rotary valve 20 aligns with each port position of the channel ports 40 for flow of the reagents through the channels 38. Moreover, as will be discussed in greater detail herein, the mappings of a single fluidic parameter or a plurality of fluidic parameters can be used to provide other characteristics of the device 10, such as variations in sizes of channel ports 40, undesired fluid leaks, undesired fluid occlusions, variations in the size of the channels, and hysteresis. Additionally, the data from the testing system 100 may be used to inspect other elements of the flow path of the reagents, including the cartridge (or device) to flowcell seal.

Moreover, though the specific examples discussed in detail are that of an air pressure testing system and a mass flow testing system, other fluidic parameters for other fluidic parameter testing systems can be utilized to do the similar mapping and analysis. For example, the fluid parameters may be rate of change of mass flow, rate of change of pressure or the like.

An important characteristic of the fluidic device 10 that needs to be measured and accounted for is rotational hysteresis. That is, rotating the rotary valve 20 from 0 degrees to 360 degrees in a clockwise direction will produce a map of channel port position 40. However, if the rotary valve 20 is rotated in the reverse counterclockwise direction, the map of channel port positions 40 often is shifted slightly in the direction of rotation. This is known as rotational hysteresis, and may be caused by such factors as tolerances in the mechanical coupling between the stepper motor 124 and the rotary valve 20 or tolerances within the fluidic device 10 itself.

The air pressure or mass flow testing system 100 (or other fluidic parameter testing system 100) can account for such hysteresis by first rotating the rotary valve 20 in a clockwise direction to a plurality of clockwise rotary valve positions of the rotary valve 20. The device 10 is then pressurized (or another fluidic parameter may be induced into device 10) at each clockwise rotary valve position. The pressure and/or mass flow (or other fluidic parameter) is then measured at each clockwise rotary valve position. Next a clockwise mapping of the pressure and/or mass flow (or other fluidic parameter) relative to the clockwise rotary valve positions is developed.

Once that is done, the rotary valve is then rotated in a counter-clockwise direction to a plurality of counter-clockwise rotary valve positions of the rotary valve. The device 10 is then pressurized (or another fluidic parameter may be induced into device 10) at each counterclockwise rotary valve position. The pressure and/or mass flow (or other fluidic parameter) is then measured at each counterclockwise rotary valve position. Next a counterclockwise mapping of the pressure and/or mass flow (or other fluidic parameter) relative to the counterclockwise rotary valve positions is developed.

Finally, the clockwise and counter-clockwise mappings are compared to determine a microfluidic device hysteresis. Often, such rotational hysteresis will shift the mapped positions of the channel ports by 1 to 3 degrees in the direction of rotation.

Referring to FIGS. 5A, 5B and 5C, examples of rotational "pressure" mappings (or graphs) 160A, 160B and 160C of three different fluidic devices 10A, 10B and 10C respectively, that are measured by air pressure testing system 100 are presented. Each of the mappings are graphs of the fluidic parameter of "pressure" vs rotary valve position of the rotary valve 20. More specifically, the mappings 160A, 160B, 160C are graphs of the pressure (in psi) induced into devices 10A, 10B, 10C by testing system 100 vs. the rotational position (in degrees from top dead center) of the inlet port 24 of the rotary valve 20 for each device.

Referring to FIG. 5A, map 160A is a pressure vs angular position graph of a fluidic device 10A that has no unwanted anomalies. Device 10A is identical to device 10, which is illustrated in FIGS. 1A and 1B. In device 10A, the inlet-outlet port 14 is set as 0 degrees (or the top dead center) for testing purposes. Device 10A includes twenty-three (23) fluidic wells 34 and channels 38, which, together with port 14, are spaced apart by a spacing angle 42 of 15 degrees each.

Each one of the pressure spokes 162 on graph 160A represent areas of sealed pressure in device 10A and have an average angular width 164 of approximately 4.5 to 5.5 degrees. More specifically, the pressure spokes represent the sealed areas between the channel ports 40 of the device 10A.

Each one of the wedged shaped low pressure sections 166 located between the pressure spokes 162 represent areas of pressure release (or leakage paths) and have an average angular width 168 of approximately 9.5 to 10.5 degrees. More specifically, the low pressure sections 166 indicate where the channel ports 40 align with the inlet port 24 to allow for pressure release and, therefore, reagent flow. Accordingly, the low pressure sections 166 are also indicative of the locations of the channel ports 40 and, as such, their angular widths 168 may be referred to herein as port channel widths 168.

The large top dead center (TDC) pressure spoke 170 represents the occluded area where the inlet-outlet port 14 of device 10A is located. The TDC pressure spoke 170 has an angular width of approximately 15 degrees.

The testing system 100 is capable of indexing the rotary valve 20 in discrete angular increments 203 (for example, 0.56 degrees, 0.056 degrees or less) that are small relative to the port channel widths 168 (for example, 10.0 degrees) within the fluidic device 10. As such, the testing system 100 can map a detailed, granular picture of the size and location of each port channel 40. Additionally, the testing system 100 is capable of mapping and measuring other characteristic and/or anomalies within a device 10, such as unwanted leakage paths, unwanted occlusions, hysteresis and more.

Referring to FIG. 5B, map 160B shows a pressure vs angular position map of a device 10B that is identical to device 10A except that one of the channel ports 40 is blocked or occluded. More specifically, from about 37 degrees to 57 degrees, there is an unwanted pressure spoke 174 where the third port channel 40 (as rotated clockwise from the TDC position) should be located. This represents a blocked channel port 40, and the testing system 100 has therefore determined that device 10B is unacceptable and must be rejected.

Referring to FIG. 5C, map 160C shows a pressure vs angular position map of a device 10C that is identical to device 10A except that there are unwanted leakage paths detected throughout most of the 360 degrees of the map, and, therefore, the device 10C must be rejected. More specifically, the pressure spokes 176 are very small or non-existent, indicating that pressure is not sealed throughout the entire rotation of the rotary valve 20. Even the pressure spoke 170 of map 160C does not hold full pressure compared to the pressure spoke 170 of map 160A, therefore indicating that there are leaks around the inlet-outlet port 14 of device 10C. The large number and magnitude of the leakage paths detected in device 10C is an indication that the rotary valve itself is not well sealed to the enclosure 12 of the device 10C (i.e., the device 10C has a flow-cell leak).

Referring to FIGS. 6A, 6B and 6C, examples of rotational "rate of change of pressure" mappings 180A, 180B and 180C of the same three fluidic devices 10A, 10B and 10C respectively are presented. Each of the mappings are graphs of the fluidic parameter of "rate of change of pressure" vs rotary valve position of the rotary valve 20. More specifically, the mappings 160A, 160B, 160C are graphs of the rate of change of pressure (in psi/second) measured by the pressure sensor 154 (after pressure has been induced into devices 10A, 10B, 10C by testing system 100) vs. the rotational position (in degrees from top dead center) of the inlet port 24 of the rotary valve 20 for each device 10. Essentially, the graphs 180A, 180B, 180C provide the same or similar information as graphs 160A, 160B, 160C except with a different fluidic parameter, i.e., "rate of change of pressure" rather than "pressure."

FIG. 6A shows a rate of change of pressure vs angular position map of the fluidic device 10A. The numerous spokes 182 represent spokes of areas having a large rate of change of pressure, or leakage paths where pressure is released rapidly. As such, they indicate the locations of the channel ports 40 as they align with the incrementally indexing inlet port 24 of rotary valve 20.

Each one of the wedged shaped low rate of change of pressure sections 184 located between the high rate of change of pressure spokes 182 represent areas of low pressure losses. More specifically, the sections 184 represent the sealed areas between the channel ports 40 of the device 10A. Additionally, the large TDC low rate of change of pressure section 186 represents the occluded area where the inlet-outlet port 14 of device 10A is located.

Referring to FIG. 6B, map 180B shows a rate of change of pressure vs. angular position map of the device 10B. In this case, the blocked third channel port is represented as a large wedged shaped section 188 of low rate of change of pressure. The wedged section 188 of graph 180B indicates the same blocked channel 40 that the large pressure spoke 174 did in graph 160B.

Referring to FIG. 6C, map 180C shows a rate of change of pressure vs. angular position map of the device 10C. In this case, the numerous leakage paths, that are likely caused by the rotary valve 20 being improperly sealed to the enclosure 12 of device 10C, are represented by a large area 190 of high rate of change of pressure throughout the 360 degrees of the map.

The threshold standard of what constitutes a high enough pressure release, or high enough rate of change of pressure, to indicate a leak depends on applications of the fluidic device being tested for. However, an example of a threshold specification for a leak in a fluidic device 10 may be as follows:

First pressurize the device to 11 psi for a particular angular position of the rotary valve 20.
If a pressure loss of 2 psi or greater is measured over a span of 5 seconds, that is indicative of a leak.
If a pressure loss of less than 2 psi is measured over a span of 5 seconds, that is indicative of a seal or occlusion.

If the measured leak occurs at the angular position of a channel port 40, that indicates an acceptably open channel. If the leak occurs in an angular location where a seal was expected, that is indicative of an unwanted leak and the device may have to be rejected.

If the measured blockage occurs at an angular position of a channel port 40, that indicates a blocked channel and the device may have to be rejected. If the occlusion occurs at an angular position between channel ports 40, that is indicative of a desired sealed area.

In some examples, an expected sealed area between channel ports 40 may have as little as 0 pressure loss in the span of 5 seconds. Also, an open channel may have as much as 3.5 psi pressure loss or more in the span of 5 seconds.

For an open channel port 40 that is aligned with the rotary valve 20 of device 10, the reagent within the channel 38 will flow at a sufficient rate through the channel 38 to perform the specific engineering tasks required of that reagent. What constitutes a sufficient rate of reagent flow depends on the applications of the fluidic device, the tasks required and the reagents. However an example of a range of sufficient reagent flows may be from 0.05 ml/minute to 2.0 ml/minute.

Note, that alignment of the rotary valve 20 to an open channel 38 is defined by applications. However for alignment to occur, the valve inlet port 24 of the rotary valve 20 and the channel port 40 of the open channel 38 need not align precisely along their centerlines to attain a specified flow rate of reagent. For example, the valve inlet port 24 centerline may be offset from the channel port 40 centerline by 20 percent of the diameter of the valve inlet port 24 or more and a specified flow rate of reagent may still be attained.

Figure 7:
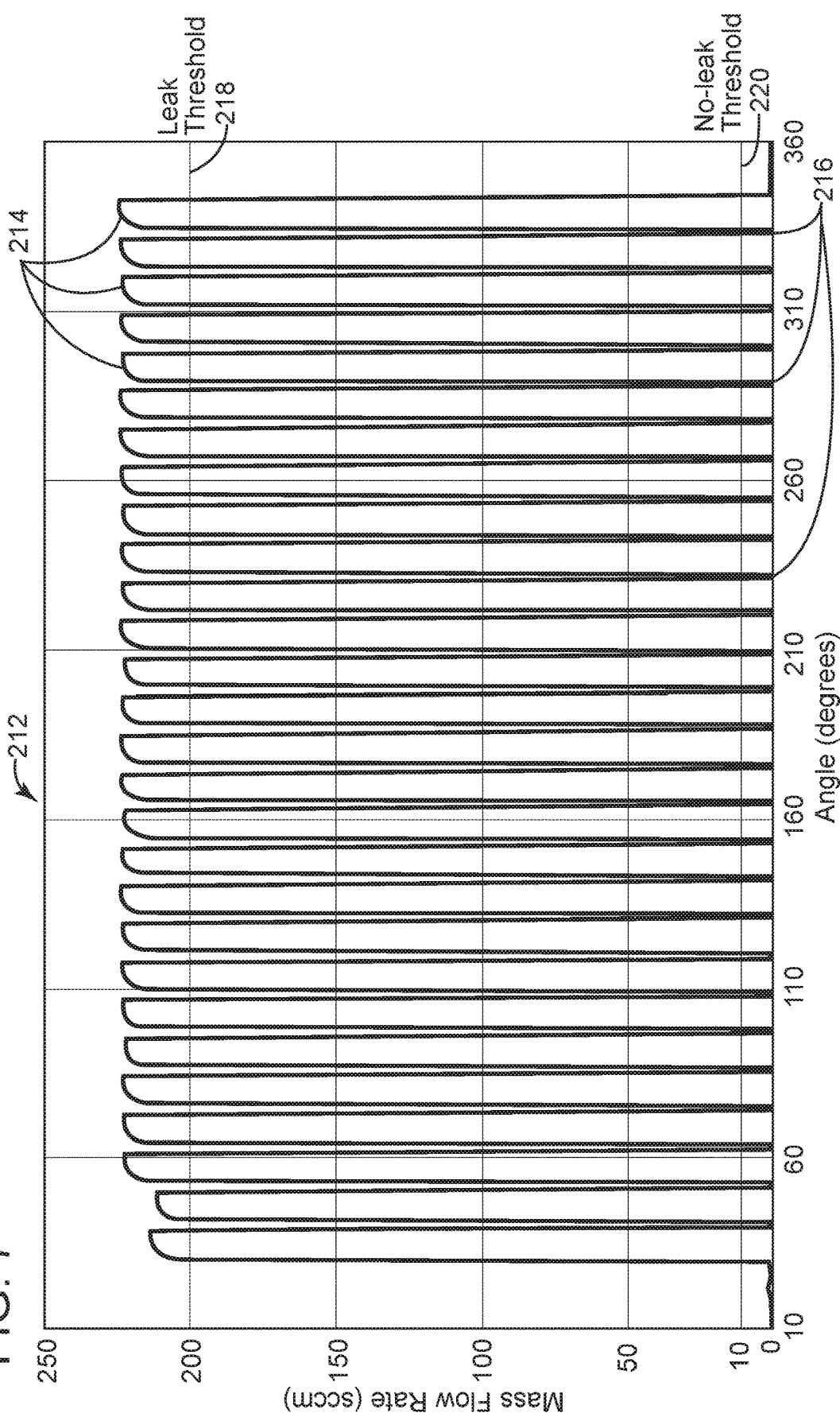
FIG. 7 is a graph of mass flow vs rotary valve angular position of a fluidic device that has no unwanted anomalies in accordance with one example described herein.

Referring to FIG. 7, graph 210 is a mass flow vs angular position graph of a fluidic device 10D as measured by mass flow testing system 100 is presented. The device 10D has no unwanted anomalies. Device 10D is similar to device 10, illustrated in FIGS. 1A and 1B. However, one of the differences between device 10 and 10D is that there are 28 open channels 38, which produce 28 high flow peaks 212. Between the channels 38 are 27 low pressure troughs 214, which are associated with sealed areas between the channels 38.

The testing system 100 is capable of continuously rotating the rotary valve 20 through rotary valve positions to be measured, wherein the rotary valve positions are spaced an angular distance apart (for example, 0.56 degrees or less) that is small relative to the port channel widths (for example, 10.0 degrees) within the fluidic device 10. As such, the testing system 100 can map a detailed, granular picture of the size and location of each port channel 40. Additionally, the testing system 100 is capable of mapping and measuring other characteristic and/or anomalies within a device 10, such as unwanted leakage paths, unwanted occlusions, hysteresis and more.

The threshold standard of what constitutes a sufficient mass flow specification to indicate a leak or a seal depends on applications of the fluidic device being tested. However, an example of a threshold specification for a leak/no-leak specification in a fluidic device 10 may be as follows:

First pressurize and maintain the device at a relatively constant pressure of 8 psi (plus or minus 0.8 psi) as the rotary valve is continuously rotated through 360 degrees of its range.
If a measured mass flow is equal to or greater than a first threshold mass flow 216 of 200 sccm, that is indicative of a leak.
If a measured mass flow is equal to or less than a second threshold mass flow 218 of 10 sccm, that is indicative of a seal or occlusion.

If the measured leak occurs at the angular position of a channel port 40, in this example that indicates an acceptably open channel and that the rotary valve is aligned with that channel port 40. If the leak occurs in an angular location where a seal was expected, that is indicative of an unwanted leak and the device may have to be rejected.

If the measured blockage occurs at an angular position of a channel port 40, that indicates a blocked channel and the device may have to be rejected. If the occlusion occurs at an angular position between channel ports 40, that is indicative of a desired sealed area that the rotary valve is aligned with.

Figure 8:
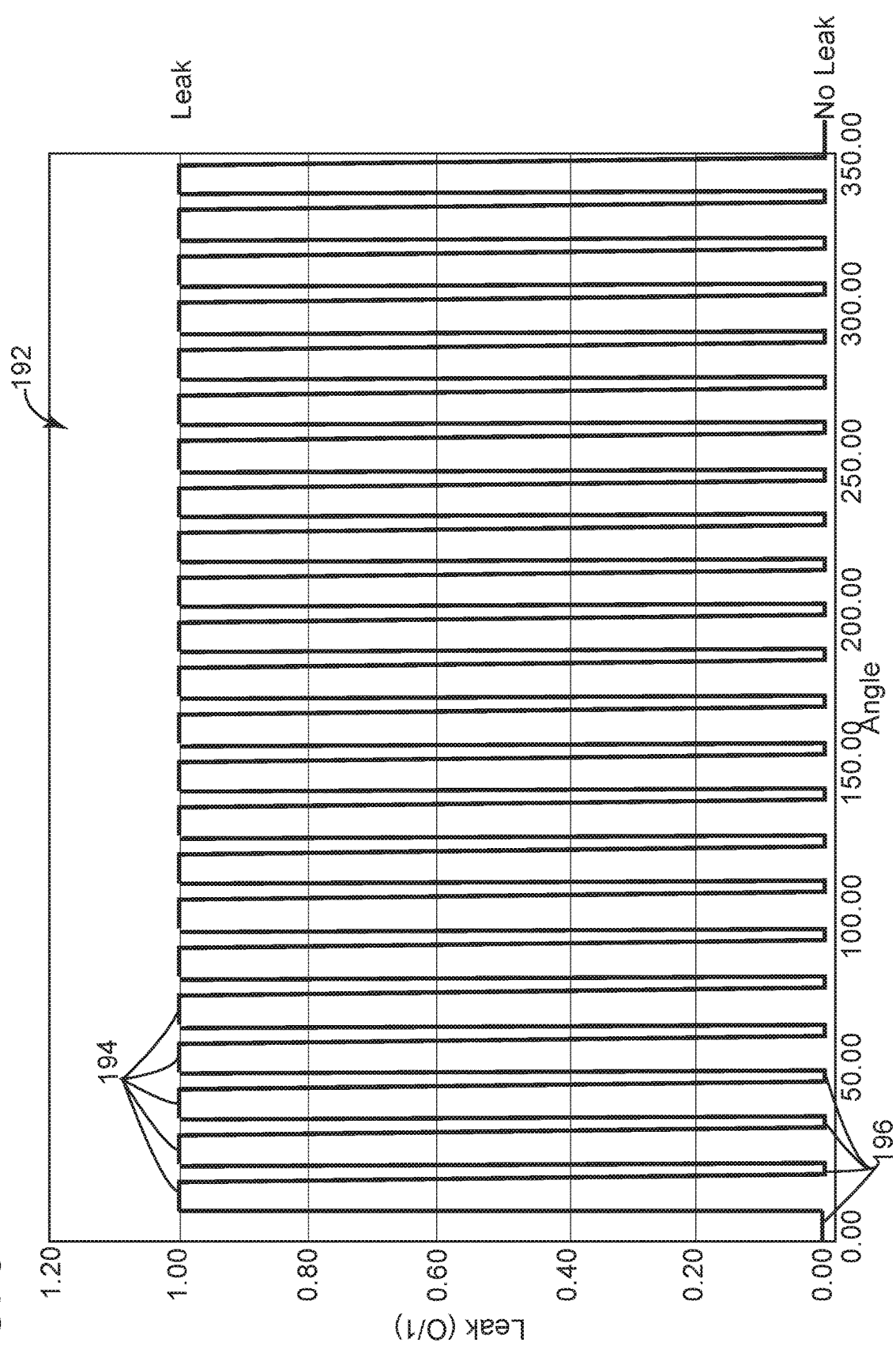
FIG. 8 is a graph of an example of a linear view of a digital mapping of leaks and occlusions of a microfluidic device in accordance with one example described herein.

Referring to FIG. 8, an example of a linear view of a digital mapping of leaks 194 and occlusions 196 of fluidic device 10A measured by air pressure testing system 100 is presented in graph 192. More specifically, graph 192 plots any pressure loss that meets or exceeds a predetermined threshold standard for a leak to a digital "1" (which represents a leak 194) and any pressure loss below the threshold is plotted as a digital "0" (which represents an occlusion 196). The digitalized leaks 194 and occlusions 196 are plotted vs. the rotary valve position of the rotary valve 20 from 0 degrees to 360 degrees.

This can be used to provide a simple pass/fail test for the device 10A. In this case, since all of the leaks 194 match the locations of the positions of the twenty-three channel ports 40 and all the occlusions 196 are located between the channel ports 40, the device 10A passes.

Figure 9:
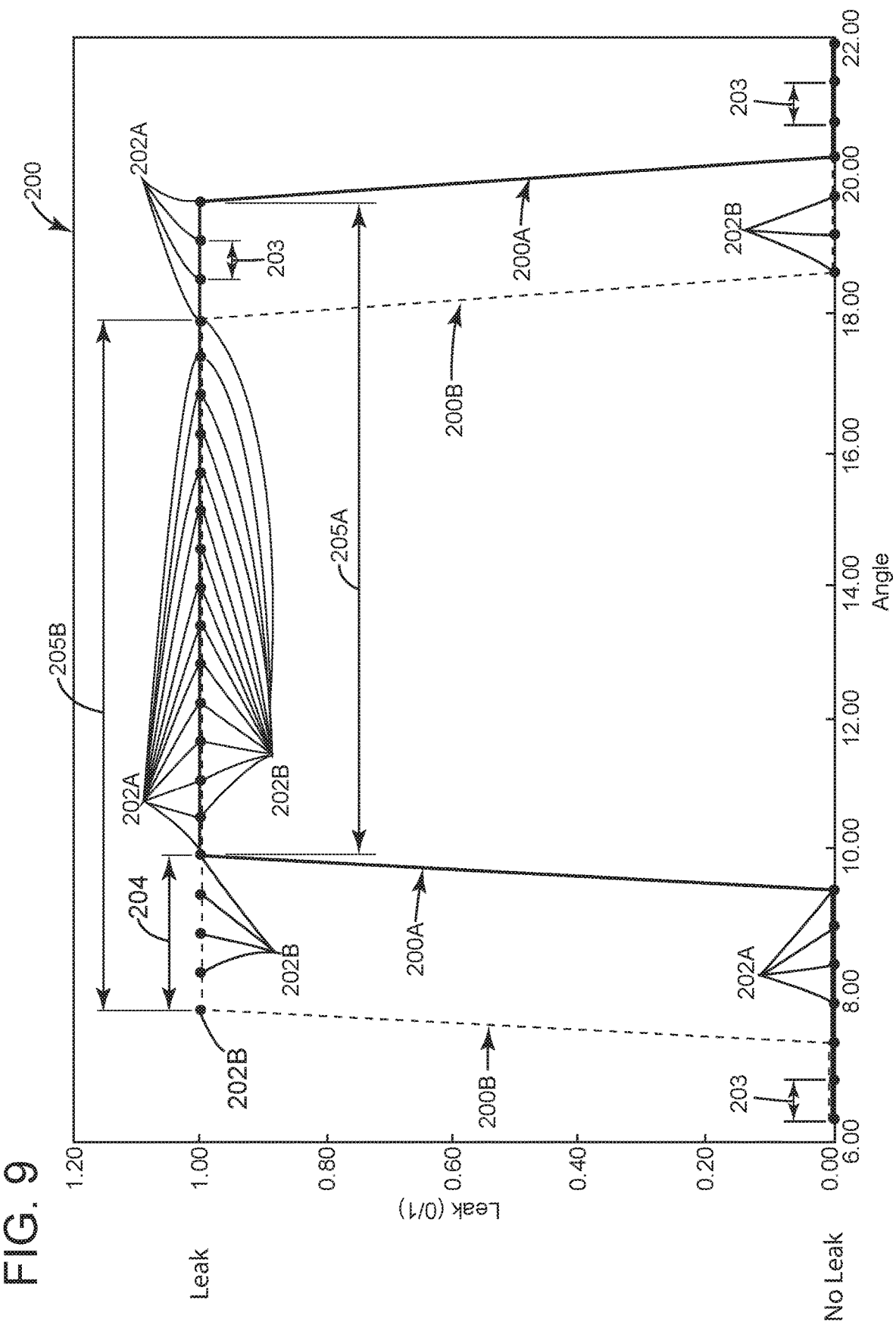
FIG. 9 is graph of an example of an expanded linear view of a digital hysteresis mapping of a microfluidic device in accordance with one example described herein.

Referring to FIG. 9, an example of an expanded linear view of a digital hysteresis mapping of fluidic device 10A measured by air pressure testing system 100 is presented in graph 200. In graph 200, the digitalized leaks (1 s) and occlusions (0 s) are plotted vs. the rotary valve positions (202) of the rotary valve 20 (in similar fashion to that of graph 192). The graph 200 is expanded to show, in detail, the incremental rotary valve positions 202 plotted over a single channel port 40. Each incremental rotary valve position 202 being indexed by a discrete angular increment 203 of 0.56 degrees from the adjacent incremental rotary valve position 202.

However, graph 200 contains two graphs 200A and 200B superimposed on each other. Graph 200A plots the digitalized leaks and occlusions associated with the measured clockwise rotary valve positions 202A when the rotary valve is rotated in the clockwise direction. Graph 200B plots the digitalized leaks and occlusions associated with the measured counterclockwise rotary valve positions 202B when the rotary valve is rotated in the counterclockwise direction.

As can be seen from the graphs 200A and 200B, the measured position of the channel port 40 has shifted in the direction of rotation by a hysteresis angle 204 of about 2 to 3 degrees. More specifically, the clockwise incremental rotary valve positions 202A that are plotted as leaks (1 s) represent the measured clockwise angular width 205A of the channel port 40, which is located approximately between 10 and 19 degrees from TDC for a measured clockwise angular width 205A of approximately 9 degrees.

The counterclockwise incremental rotary valve positions 202B that are plotted as leaks represent the measured counterclockwise angular width 205B of the channel port 40, which is located approximately between 8 and 18 degrees from TDC for a measured counterclockwise angular width 205B of approximately 10 degrees. This shift in the channel port's 40 location, and measured angular width, may be due to clearance tolerances in the rotary valve itself and must be accounted for during the operation of the device 10A.

Also as can be seen from the graphs 200A and 200B, the incremental rotary valve positions 202A and 202B are indexed (or rotated) in discrete angular increments 203 that are small relative to the measured clockwise angular width 205A and the measured counterclockwise angular width 205B of the channel port 40. In this case, the incremental rotary valve positions 202A, 202B are indexed in angular increments that are at least an order of magnitude smaller than the measured clockwise and counterclockwise angular widths 205A, 205B (herein collectively the angular widths 205). In one example, this size difference is important in order to obtain the resolution (or granularity) to be able to detect and measure the hysteresis that occurs upon reversing direction from clockwise to counterclockwise rotation.

Moreover, in one example it is important that the discrete angular increments 203 between each measured rotary valve 20 position be smaller than the angular widths 205 of the port channels 40 for resolution of any one of the fluidic characteristics measured by testing system 100. For example, the discrete angular increments 203 may be equal to or less than 25 percent of the angular widths of the port channels 40. Additionally, the discrete angular increments may be equal to or less than 20 percent of the angular widths of the port channels 40. Also, the discrete angular increments may be equal to or less than 10 percent of the angular widths of the port channels 40.

Figure 10:
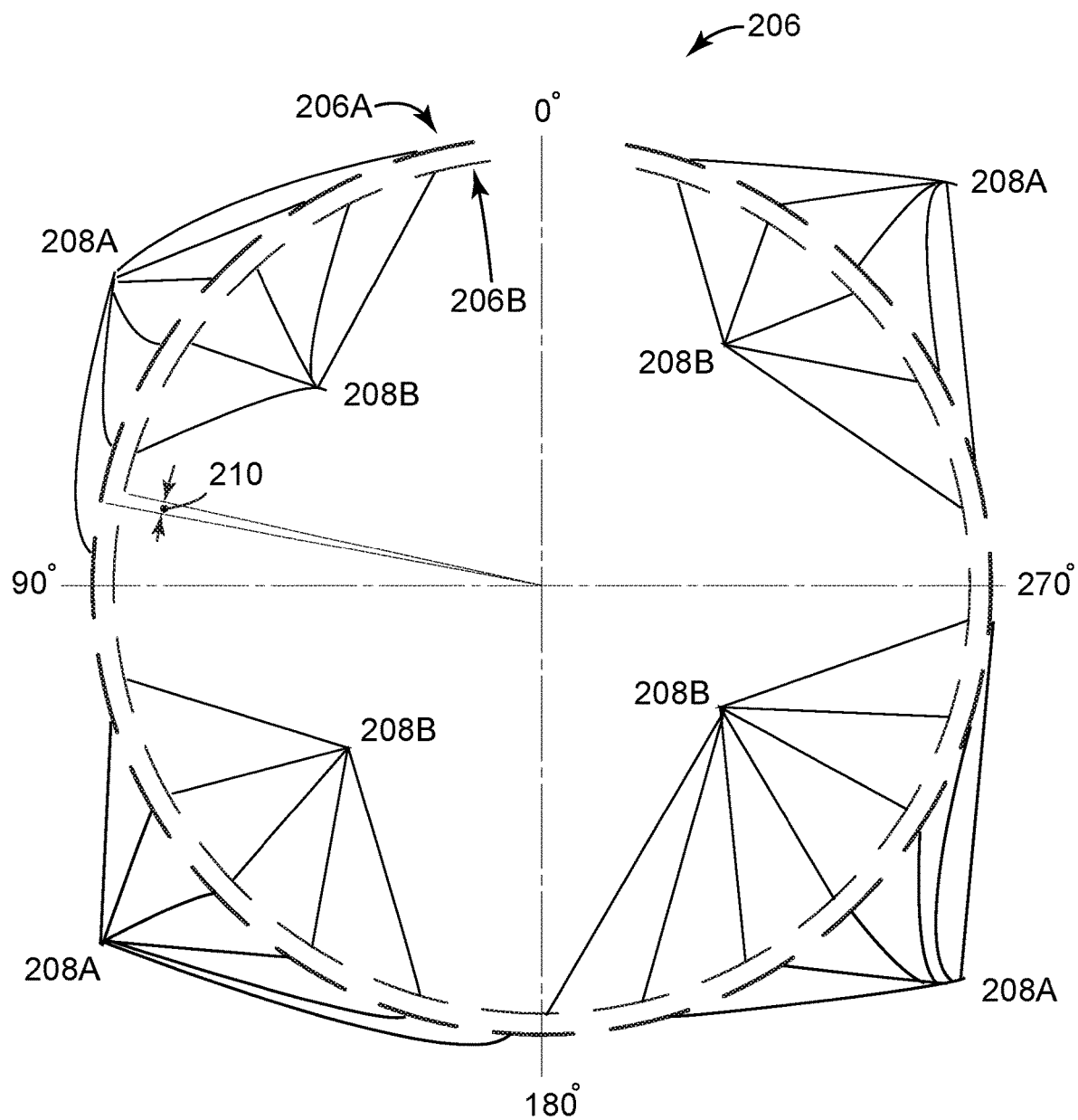
FIG. 10 is a graph of an example of a 360 degree rotational view of a digital hysteresis mapping of a microfluidic device in accordance with one example described herein.

Referring to FIG. 10, an example of a 360 degree rotational view of a digital hysteresis mapping of fluidic device 10A as measured by air pressure testing system 100 is presented in graph 206. Again, graph 206 is two graphs 206A and 206B superimposed on each other. Graph 206A plots the digitalized leaks and occlusions associated with the rotary valve positions when the rotary valve was rotated in the clockwise direction. Graph 206B plots the digitalized leaks and occlusions associated with the rotary valve positions when the rotary valve was rotated in the counterclockwise direction.

In graph 206A, the areas that are plotted as leaks represent the measured clockwise locations 208A of the twenty-three channel ports 40. In graph 206B, the areas that are plotted as leaks represent the measured counterclockwise locations 208B of the twenty-three channel ports 40. As can be seen by the graph 206, the hysteresis angle 208 is about 2 to 3 degrees and is consistent around the 360 degrees of rotation.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the forgoing disclosure has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. A method of testing a microfluidic device comprising:
   providing a fluidic parameter testing system having a motor operable to rotate an internal rotary valve of the microfluidic device and a sensor operable to measure a fluidic parameter;
   interfacing a microfluidic device to the fluidic parameter testing system, the microfluidic device comprising:
   an internal rotary valve, and
   internal fluidic channels, each channel having a port with a predetermined port position that the rotary valve is to align to in order to select any one of a plurality of reagents which flow through the channels;
   rotating the rotary valve via the testing system to a plurality of rotary valve positions of the rotary valve;
   measuring using the sensor a fluidic parameter of the microfluidic device at each rotary valve position, wherein a plurality of valve positions are between port positions and the measuring includes measuring for leakages between the port positions;

mapping the fluidic parameter relative to the rotary valve positions;

providing a visual indication of the mapping to a user;

determining from the mapping if the rotary valve aligns with each of the predetermined port positions for a flow of the reagents through the channels; and determining from the mapping whether the microfluidic device is unacceptable for use wherein said determining is prior to use of the microfluidic device for a gene sequencing operation.

2. The method of claim 1, comprising inducing the fluidic parameter into the microfluidic device at each rotary valve position prior to measuring the fluidic parameter.

3. The method of claim 1, comprising:
measuring a plurality of fluidic parameters at each rotary valve position;
mapping the plurality of fluidic parameters relative to the rotary valve positions; and
determining from the mapping of the plurality of fluidic parameters if the rotary valve aligns with each of the predetermined port positions for the flow of the reagents through the channels.

4. The method of claim 1, wherein the fluidic parameter is one of a pressure parameter and a mass flow parameter.

5. The method of claim 4, wherein:
the pressure parameter is one of a pressure, a pressure difference and a rate of change of pressure; and
the mass flow parameter is one of a mass flow and a rate of change of mass flow.

6. The method of claim 1, comprising:
determining positions of undesired fluid occlusions and undesired fluid leak paths within the microfluidic device from the mapping.

7. The method of claim 1, comprising:
determining variations in sizes of the channel ports from the mapping.

8. The method of claim 1, comprising:
rotating the rotary valve in a clockwise direction to a plurality of clockwise rotary valve positions of the rotary valve;
inducing the fluidic parameter into the microfluidic device at each clockwise rotary valve position;
measuring the fluidic parameter at each clockwise rotary valve position;
clockwise mapping the fluidic parameter relative to the clockwise rotary valve positions;
rotating the rotary valve in a counter-clockwise direction to a plurality of counter-clockwise rotary valve positions of the rotary valve;
inducing the fluidic parameter into the microfluidic device at each counter-clockwise rotary valve position;
measuring the fluidic parameter at each counter-clockwise rotary valve position;
counter-clockwise mapping the fluidic parameter relative to the counter-clockwise rotary valve positions; and
comparing the clockwise and counter-clockwise mappings to determine a microfluidic device hysteresis.

9. The method of claim 1, comprising:
rotating the rotary valve in discrete angular increments, each increment corresponding to one of the plurality of rotary valve positions;
wherein the discrete angular increments are less than or equal to one of:
25 percent of an angular width of each port of each channel,
20 percent of an angular width of each port of each channel, and
10 percent of an angular width of each port of each channel.

10. The method of claim 1 comprising rotating the rotary valve continuously through each rotary valve position.

11. A method of testing a microfluidic device comprising:
providing a fluidic parameter testing system having a motor operable to rotate an internal rotary valve of the microfluidic device and a sensor operable to measure a fluidic parameter;
interfacing the microfluidic device to a fluidic parameter testing system, wherein the fluidic parameter is one of air pressure and mass flow, the microfluidic device comprising:
an internal rotary valve, and
internal fluidic channels, each channel having a port with a predetermined port position that the rotary valve is to align to in order to select any one of a plurality of reagents which flow through the channels;
rotating the rotary valve via the fluidic parameter testing system to a plurality of rotary valve positions of the rotary valve;
measuring using the sensor one of an air pressure and a mass flow of the microfluidic device at each rotary valve position, wherein a plurality of valve positions are between port positions and the measuring includes measuring for leakages between the port positions;
mapping the one of the air pressure and the mass flow relative to the rotary valve positions;
providing a visual indication of the mapping to a user in the form of a graph or table;
determining from the mapping if the rotary valve aligns with each of the predetermined port positions for a flow of the reagents through the channels; and
determining from the mapping whether the microfluidic device is unacceptable for use wherein said determining is prior to use of the microfluidic device for a gene sequencing operation.

12. The method of claim 11 wherein the fluid parameter is air pressure, the method comprising:
pressurizing the microfluidic device from a source of pressurized air to a predetermined pressure at each rotary valve position prior to measuring;
sealing the microfluidic device from the source of pressurized air when the predetermined pressure has been reached at each rotary valve position;
determining that the rotary valve is aligned with any one of the predetermined port positions if the predetermined pressure is released when the rotary valve position corresponds to the any one of the predetermined port positions; and
determining that the rotary valve is sealed if the predetermined pressure is held when the rotary valve position corresponds to a position other than the any one of the predetermined port positions.

13. The method of claim 11, comprising:
measuring a plurality of fluidic parameters at each rotary valve position, the fluidic parameters being at least one of a pressure, a pressure difference, a rate of change of pressure, a mass flow and a rate of change of mass flow;
mapping the plurality of fluidic parameters relative to the rotary valve positions; and
determining from the mapping of the plurality of fluidic parameters if the rotary valve aligns with each of the predetermined port positions for the flow of the reagents through the channels.

14. The method of claim 12, comprising:
including the air pressure testing system with:
an air switch valve connected to an air source of relatively constant air pressure, and
a small volume air chamber connected in open fluid communication between the air switch valve and the microfluidic device, the air switch valve operative to control fluid communication from the air source to the chamber;
operating the air switch valve to open fluid communication from the air source to the chamber at each rotary valve position;
pressurizing the microfluidic device to the predetermined pressure;
operating the air switch valve to close fluid communication from the air source to the chamber once the predetermined pressure has been reached in the microfluidic device; and
measuring the air pressure at each rotary valve position in the microfluidic device after fluid communication from the air source to the chamber has been closed.

15. The method of claim 11, wherein the fluid parameter is mass flow, the method comprising:
rotating the rotary valve continuously through each rotary valve position;
measuring the mass flow of the microfluidic device at each rotary valve position;
determining that the rotary valve is aligned with any one of the predetermined port positions if the mass flow is equal to or above a first threshold mass flow; and
determining that the rotary valve is sealed if the mass flow is equal to or below a second threshold mass flow when the rotary valve position corresponds to a position other than the any one of the predetermined port positions.

16. The method of claim 11, wherein the fluid parameter is air pressure, the method comprising:
rotating the rotary valve in discrete angular increments, each increment corresponding to one of the plurality of rotary valve positions;
wherein the discrete angular increments are less than or equal to about 10 percent of an angular width of each port of each channel.

17. A method of testing a microfluidic device comprising:
providing a fluidic parameter testing system having a motor operable to rotate an internal rotary valve of the microfluidic device and a sensor operable to measure a fluidic parameter;
interfacing the microfluidic device to a fluidic parameter testing system, wherein the fluidic parameter is one of air pressure and mass flow, the microfluidic device comprising:
an internal rotary valve, and
internal fluidic channels, each channel having a port with a predetermined port position that the rotary valve is to align to in order to select any one of a plurality of reagents which flow through the channels;
rotating the rotary valve with the motor in a clockwise direction to a plurality of clockwise rotary valve positions of the rotary valve;
measuring using the sensor the one of the air pressure and the mass flow at each clockwise rotary valve position;
clockwise mapping the one of the air pressure and the mass flow relative to the clockwise rotary valve positions;
rotating the rotary valve with the motor in the counter-clockwise direction to a plurality of counter-clockwise rotary valve positions of the rotary valve;
measuring using the sensor the one of the air pressure and the mass flow at each counter-clockwise rotary valve position;
counter-clockwise mapping the one of the air pressure and the mass flow relative to the counter-clockwise rotary valve positions; and
comparing the clockwise and counter-clockwise mappings to determine a microfluidic device hysteresis;
determining from the hysteresis whether the microfluidic device is unacceptable for use wherein said determining is prior to use of the microfluidic device for a gene sequencing operation.

* * * * *